US011755882B2

(12) United States Patent
Lee

(10) Patent No.: US 11,755,882 B2
(45) Date of Patent: Sep. 12, 2023

(54) METHOD, APPARATUS AND SYSTEM FOR RECOMMENDING LOCATION OF ROBOT CHARGING STATION

(71) Applicant: LG ELECTRONICS INC., Seoul (KR)

(72) Inventor: Hak Joo Lee, Gyeonggi-do (KR)

(73) Assignee: LG ELECTRONICS INC., Seoul (KR)

(*) Notice: Subject to any disclaimer, the term of this patent is extended or adjusted under 35 U.S.C. 154(b) by 917 days.

(21) Appl. No.: 16/557,888

(22) Filed: Aug. 30, 2019

(65) Prior Publication Data

US 2019/0385042 A1    Dec. 19, 2019

(30) Foreign Application Priority Data

Jul. 26, 2019  (KR) .................. 10-2019-0091050

(51) Int. Cl.
*G05D 1/00*    (2006.01)
*G06N 3/00*    (2023.01)
(Continued)

(52) U.S. Cl.
CPC .......... *G06N 3/043* (2023.01); *G05D 1/0225* (2013.01); *G06N 3/08* (2013.01)

(58) Field of Classification Search
CPC ...... G06N 3/0436; G06N 3/043; G06N 3/048; G06N 3/08; G06N 3/006; G05D 1/0221;
(Continued)

(56) References Cited

U.S. PATENT DOCUMENTS 3,147,817 A * 9/1964 De Liban ............. G05D 1/0225
                                                    342/410
5,696,502 A * 12/1997 Busch .................. G08G 1/0104
                                                    340/919
(Continued)

FOREIGN PATENT DOCUMENTS

CN   109658697 B  *  9/2021  ........... G08G 1/0125
JP   2019114300 A  *  7/2019  ............. G06Q 50/30
(Continued)

OTHER PUBLICATIONS

Merriam Webster Dictionary, Definition density (Year: 2019).*
Oxford English Dictionary, Definition traffic density (Year: 2023).*

*Primary Examiner* — Angelina Shudy
(74) *Attorney, Agent, or Firm* — LEE, HONG, DEGERMAN, KANG & WAIMEY PC

(57) ABSTRACT

A method, an apparatus, and a system for recommending a location of a charging station of a robot are disclosed. The method includes obtaining movement path information from one or more robots in a space including a plurality of regions, determining density of each of the plurality of regions based on the obtained movement path information, and determining a recommended location of a charging station for charging the one or more robots from the plurality of regions based on the determined density. In a 5G environment connected for the Internet of things, the method for recommending a location of a charging station is implemented by executing an artificial intelligence algorithm or machine learning algorithm.

15 Claims, 7 Drawing Sheets

(51) Int. Cl.
*G06N 3/043* (2023.01)
*G05D 1/02* (2020.01)
*G06N 3/08* (2023.01)

(58) Field of Classification Search
CPC ....... G05D 1/0225; B25J 11/00; B25J 19/005; G06Q 10/04
See application file for complete search history.

(56) References Cited

U.S. PATENT DOCUMENTS

| | | | | |
|---|---|---|---|---|
| 7,541,943 | B2* | 6/2009 | Manor | G08G 1/01 340/522 |
| 8,730,059 | B2* | 5/2014 | Davis | G08G 1/07 340/916 |
| 9,751,214 | B2* | 9/2017 | Kim | A47L 11/4011 |
| 9,934,683 | B2* | 4/2018 | Fowe | G08G 1/0967 |
| 10,499,446 | B1* | 12/2019 | Dowlatkhah | H04W 4/08 |
| 11,348,269 | B1* | 5/2022 | Ebrahimi Afrouzi | G06V 20/56 |
| 2013/0222158 | A1* | 8/2013 | Dai | B60L 53/68 340/995.13 |
| 2015/0262206 | A1* | 9/2015 | Dai | G06Q 30/0202 705/7.31 |
| 2015/0354974 | A1* | 12/2015 | Takehara | B60L 53/66 701/423 |
| 2016/0343011 | A1* | 11/2016 | Yamashina | B60L 53/63 |
| 2017/0190510 | A1* | 7/2017 | Porat | B64F 1/32 |
| 2018/0037136 | A1* | 2/2018 | Nelson | B60L 53/51 |
| 2018/0201148 | A1* | 7/2018 | Donnelly | B60L 53/64 |
| 2018/0238698 | A1* | 8/2018 | Pedersen | G06N 5/048 |
| 2018/0373268 | A1* | 12/2018 | Antunes Marques Esteves | B60L 58/12 |
| 2019/0051155 | A1* | 2/2019 | Yamaguchi | G08G 1/0965 |
| 2019/0122157 | A1* | 4/2019 | Jenkins | G05D 1/0291 |
| 2019/0172165 | A1* | 6/2019 | Verteletskyi | G06Q 10/06315 |
| 2019/0205842 | A1* | 7/2019 | Starns | G06Q 30/0639 |
| 2019/0212161 | A1* | 7/2019 | Pedersen | G01C 21/3476 |
| 2019/0217735 | A1* | 7/2019 | Donnelly | G05D 1/0088 |
| 2019/0366867 | A1* | 12/2019 | Gariepy | B60L 53/66 |
| 2019/0381903 | A1* | 12/2019 | Shin | B60L 15/20 |
| 2019/0385042 | A1* | 12/2019 | Lee | G06Q 10/04 |
| 2020/0009982 | A1* | 1/2020 | Kim | H02J 7/025 |
| 2020/0216068 | A1* | 7/2020 | Tashiro | B60W 30/146 |
| 2020/0368913 | A1* | 11/2020 | Scott | G01N 35/00871 |
| 2020/0387164 | A1* | 12/2020 | Chae | G05D 1/0225 |
| 2021/0081624 | A1* | 3/2021 | Kovarik | G06K 7/10376 |
| 2021/0089040 | A1* | 3/2021 | Ebrahimi Afrouzi | A47L 9/2894 |
| 2021/0162593 | A1* | 6/2021 | Jang | B25J 9/1666 |
| 2021/0276441 | A1* | 9/2021 | Ben-David | G05D 1/0225 |
| 2022/0026920 | A1* | 1/2022 | Ebrahimi Afrouzi | G05D 1/0044 |
| 2022/0076358 | A1* | 3/2022 | Cao | G06F 17/12 |

FOREIGN PATENT DOCUMENTS

| | | | |
|---|---|---|---|
| KR | 100517917 | | 9/2005 |
| KR | 100517917 B1 * | | 10/2005 |
| KR | 101817127 B1 * | 1/2018 | ............ G06Q 50/30 |
| WO | WO-2016114281 A1 * | 7/2016 | ............ G06Q 50/30 |

* cited by examiner

METHOD, APPARATUS AND SYSTEM FOR RECOMMENDING LOCATION OF ROBOT CHARGING STATION

CROSS-REFERENCE TO RELATED APPLICATION

Pursuant to 35 U.S.C. § 119(a), this application claims the benefit of earlier filing date and right of priority to Korean Patent Application No. 10-2019-0091050, filed on Jul. 26, 2019, the contents of which are hereby incorporated by reference herein in its entirety.

BACKGROUND

1. Field

The present disclosure relates to a robot, and more particularly, to recommending a charging station based on analyzing a movement path of a robot.

2. Background

Recently, robots that may be conveniently used in daily life are being developed. Such robots are used to help people in their daily lives at home, school, and other public places.

The robot has a built-in rechargeable battery, and the robot moves to a charging station to charge the battery when the battery level is insufficient. According to the related art, a location of a charging station is subjectively determined by a manager.

However, the charging station may be placed in an inefficient location when the manager has a lack of understanding of a workspace and working attributes of a robot. In this case, the robot may move inefficiently to the charging station while performing a task.

The efficiency of a movement path is important for mobile robots which mainly perform tasks while moving, such as guide robots, shipping robots, and cleaning robots. In addition, the workspace of robots have gradually expanded from narrow spaces such as homes to large spaces such as airports. The number of robots in operation has also increased. Therefore, inefficient movement of a robot may result in a large amount of lost resources over time.

In Korean Patent Application No. 10-0517917, entitled "Charge device position decision method for robot," a method for selecting an optimal location to place a charging station is disclosed. Here, a robot scans a specific region by measuring a location or angle of an obstacle using ultrasonic waves or infrared rays while moving along a wall within the specific region, and analyzes the specific region to select a widest region without an obstacle as an optimal location to place a charging station. However, from a long-term perspective, it is necessary to determine a location of a charging station allowing a robot to move efficiently and resources to be used efficiently.

SUMMARY OF THE INVENTION

An aspect of the present disclosure is to provide a method, apparatus, and system for recommending a location of a charging station to allow a robot to move efficiently.

An aspect of the present disclosure is to provide a method, apparatus, and system for recommending a location of a charging station for the efficient usage of resources.

Embodiments of the present disclosure are not limited to the above-mentioned aspects, and other aspects of the present disclosure, which are not mentioned above, may be understood from the following description and will be more clearly understood from embodiments of the present disclosure. Moreover, aspects of the present disclosure may be realized by the means and combinations thereof indicated in the claims.

According to an embodiment of the present disclosure, a method, apparatus, and system for recommending a location of a charging station may determine density of each of a plurality of regions by analyzing movement path information of one or more robots in a space including a plurality of regions, and may determine a recommended location of the charging station based on the determined density.

According to an embodiment of the present disclosure, a method for recommending a location of a charging station may include obtaining movement path information from one or more robots in a space including a plurality of regions, determining density of each of the plurality of regions based on the obtained movement path information, and determining a recommended location of a charging station for charging the one or more robots from the plurality of regions based on the determined density.

The movement path information may include coordinate information of the one or more robots, obtained periodically for a predetermined period of time.

The determining the density may include determining a count value for each of the plurality of regions by associating the obtained movement path information with a corresponding region of the plurality of regions, and determining the density based on the determined count value.

The method for recommending a location of a charging station according to an embodiment of the present disclosure may further include loading a movement path profile, and updating the movement path profile by using the obtained movement path information, wherein the determining the density may include determining the density based on the updated movement path profile.

The movement path profile may include a cumulative count value for each of the plurality of regions, and the updating the movement path profile may include adjusting the cumulative count value by associating the obtained movement path information with a corresponding region of the plurality of regions.

The updating the movement path profile may further include adjusting the cumulative count value by reducing a weight for movement path information previously obtained with respect to a weight for the obtained movement path information.

The method for recommending a location of a charging station according to an embodiment of the present disclosure may further include obtaining driving information of the one or more robots, and determining a degree of congestion on each of the plurality of regions based on the obtained driving information, wherein the determining a recommended location of a charging station may be further based on the determined degree of congestion.

The driving information may include an average moving speed of the robot, the number of times in which the robot is stopped while driving, the number of times in which the robot collides with an object, or a combination thereof.

The determining a recommended location of a charging station may include extracting one or more candidate regions having density equal to or greater than a first reference value, from the plurality of regions, and determining the recommended location from the one or more candidate regions and a region adjacent to the candidate region.

Each of the plurality of regions may include a plurality of subregions, and the extracting the candidate region may include extracting one or more candidate subregions having density equal to or greater than a second reference value, from the one or more candidate regions.

The determining a recommended location of a charging station may further include excluding a predetermined unsuitable region from the recommended location.

The method for recommending a location of a charging station according to an embodiment of the present disclosure may further include guiding the recommended location via the one or more robots, or guiding the recommended location via a separate terminal.

The method for recommending a location of a charging station according to an embodiment of the present disclosure may further include training an artificial neural network by using information about the space, movement path information and driving information of the one or more robots, and the recommended location of the charging station, as learning data.

The method for recommending a location of a charging station according to an embodiment of the present disclosure may further include determining the recommended location of the charging station based on analyzing the obtained movement path information or the determined density by using a learning model based on the artificial neural network.

According to an embodiment of the present disclosure, an apparatus for recommending a location of a charging station may include a communications unit for communicating with one or more robots in a space including a plurality of regions, and at least one processor, wherein the at least one processor obtains movement path information from the one or more robots, determines density of each of the plurality of regions based on the obtained movement path information, and determines a recommended location of a charging station for charging the one or more robots from the plurality of regions based on the determined density.

The apparatus for recommending a location of a charging station according to an embodiment of the present disclosure may further include a memory storing a movement path profile, wherein the at least one processor may update the movement path profile by using the obtained movement path information and determine the density based on the updated movement path profile.

The movement path profile may include a cumulative count value for each of the plurality of regions, and the at least one processor may adjust the cumulative count value by associating the obtained movement path information with a corresponding region of the plurality of regions, and determine the density based on the adjusted cumulative count value.

The apparatus may include one of the one or more robots, a control server, or a terminal connected to the control server for communication.

According to an embodiment of the present disclosure, a system for recommending a location of a charging station may include one or more robots in a space including a plurality of regions, a charging station for charging the one or more robots, and a control server for determining a recommended location of the charging station based on movement path information of the one or more robots, wherein the control server may obtain the movement path information from the one or more robots, determine density of each of the plurality of regions based on the obtained movement path information, and determine a recommended location of the charging station from the plurality of regions based on the determined density.

According to an embodiment of the present disclosure, a program code is stored in a computer readable storage medium, and the program code allows at least one processor to obtain movement path information from one or more robots in a space including a plurality of regions, determines density of each of the plurality of regions based on the obtained movement path information, and determines a recommended location of a charging station for charging the one or more robots from the plurality of regions based on the determined density, while the program code is executed.

According to an embodiment of the present disclosure, a location of a charging station allowing efficient movement of a robot and efficient usage of resources may be determined.

The usage of a movement path profile may allow movement path analysis in the past to be considered, thereby determining an efficient location of a charging station from a long-term perspective.

Summary data may be only maintained in a movement path profile, thereby improving the processing speed and efficiency.

As a decay model may be applied to a movement path profile, the decay model may respond flexibly to a change in a movement path in a space.

Effects of the present disclosure are not limited to the above-mentioned effects, and other effects, not mentioned above, will be clearly understood by those skilled in the art from the description of the claims.

BRIEF DESCRIPTION OF THE DRAWINGS

The above and other aspects and features of the present disclosure will become apparent from the detailed description of the following aspects in conjunction with the accompanying drawings.

DETAILED DESCRIPTION

Figure 1:
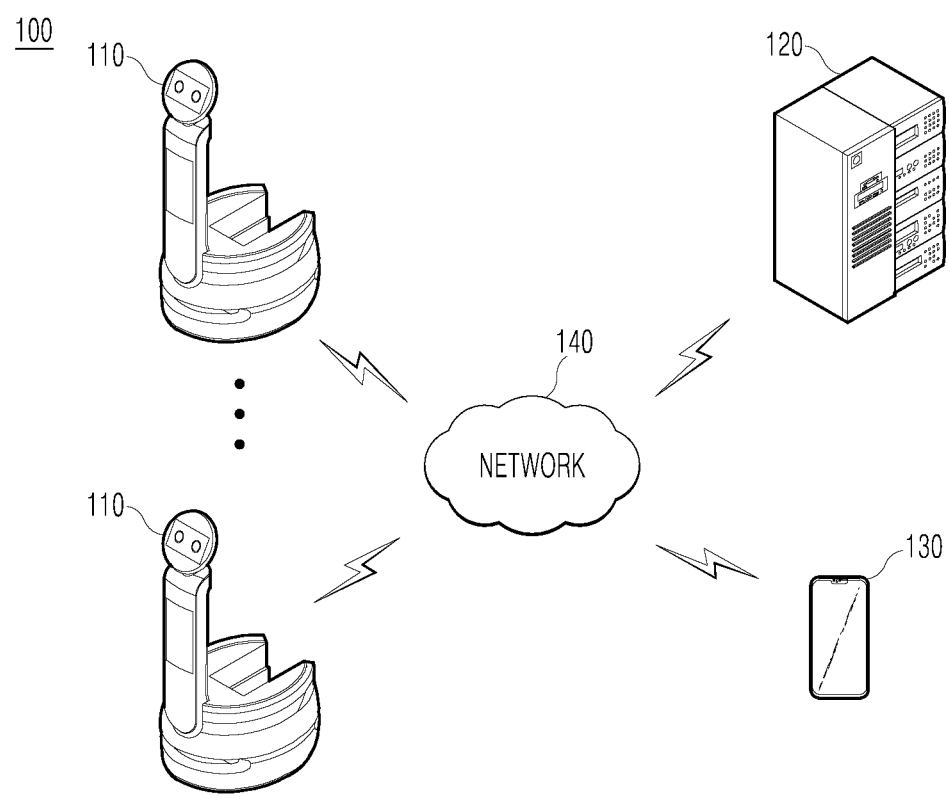
FIG. 1 is a view of a robot system according to an embodiment of the present disclosure.

Hereinafter, embodiments of the present disclosure will be described in detail with reference to the accompanying drawings. Like reference numerals refer to the like elements throughout and a duplicate description thereof is omitted.

Suffixes "module" and "unit or portion" for elements used in the following description are merely provided for facilitation of preparing this specification, and thus they are not granted a specific meaning or function. In relation to describing the present disclosure, when the detailed description of the relevant known technology is determined to unnecessarily obscure the gist of the present disclosure, the detailed description may be omitted. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like, may be used herein to describe various elements, components, regions, layers, and/or sections, these elements, components, regions, layers, and/or sections should not be limited by these terms. Furthermore, these terms such as "first," "second," and other numerical terms, are used only to distinguish one element from another element.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

A robot may refer to a machine which automatically handles a given task by its own ability, or which operates autonomously. In particular, a robot having a function of recognizing an environment and performing an operation according to its own judgment may be referred to as an intelligent robot.

Robots may be classified into industrial, medical, household, and military robots, according to the purpose or field of use.

A robot may include an actuator or a driving unit including a motor in order to perform various physical operations, such as moving joints of the robot. Moreover, a movable robot may include, for example, a wheel, a brake, and a propeller in the driving unit thereof, and through the driving unit may thus be capable of traveling on the ground or flying in the air.

Autonomous driving refers to a technology in which driving is performed autonomously, and an autonomous vehicle refers to a vehicle capable of driving without manipulation of a user or with minimal manipulation of a user.

For example, autonomous driving may include a technology in which a driving lane is maintained, a technology such as adaptive cruise control in which a speed is automatically adjusted, a technology in which a vehicle automatically drives along a defined route, and a technology in which a route is automatically set when a destination is set.

A vehicle includes a vehicle having only an internal combustion engine, a hybrid vehicle having both an internal combustion engine and an electric motor, and an electric vehicle having only an electric motor, and may include not only an automobile but also a train and a motorcycle.

In this case, an autonomous vehicle may be considered as a robot with an autonomous driving function.

FIG. 1 is a view of a robot system according to an embodiment of the present disclosure. Referring to FIG. 1, a robot system according to an embodiment of the present disclosure includes one or more robots 110 and a control server 120, and may optionally further include a terminal 130.

The one or more robots 110, the control server 120, and the terminal 130 may be connected to each other via a network 140. The apparatuses, such as the one or more robots 110, the control server 120, and the terminal 130, communicate with each other via a base station, but may communicate directly with each other without the need for a base station.

The one or more robots 110 may perform a task in a space, and provide information or data related to the task for the control server 120. A workspace of a robot may be indoors or outdoors. A robot may be operated in a space predefined by a wall or a column. In this case, a workspace of a robot may be defined in various ways depending on the design purpose, working attributes of the robot, mobility of the robot, and other factors. A robot may be operated in an open space, which is not predefined. The robot may also sense a surrounding environment and determine a workspace by its own accord.

The control server 120 may perform various analysis based on information or data provided by the one or more robots 110, and control overall operation of a robot system based on the analysis result. In an aspect, the control server 120 may directly control driving of the robot 110 based on the analysis result. In another aspect, the control server 120 may derive and output useful information or data from the analysis result. In still another aspect, the control server 120 may adjust parameters in a robot system using the derived information or data. The control server 120 may be implemented as a single server but may be implemented as a plurality of server sets, a cloud server, or a combination thereof.

The terminal 130 may share a portion of a role of the control server 120. In an aspect, the terminal 130 may obtain information or data from the one or more robots 110 and provide the information or data for the control server 120, or may obtain information or data from the control server 120 and provide the information or data for the one or more robots 110. In another aspect, the terminal 130 may share at least a portion of analysis to be performed by the control server 120, and may provide a result of the analysis for the control server 120. In still another aspect, the terminal 130 may receive an analysis result, information, or data from the control server 120, and may simply output the analysis result, information, or data.

In an embodiment, the terminal 130 may replace the control server 120. In another embodiment, at least one robot of a plurality of robots 110 may replace the control server 120. In this case, the plurality of robots 110 may be connected to communicate with each other.

The terminal 130 may include various electronic devices capable of communicating with the robot 110 and the control server 120. The terminal 130 may be implemented as a stationary terminal and a mobile terminal, such as a mobile phone, a projector, a mobile phone, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, and digital signage.

The network 140 may refer to a network which composes a portion of a cloud computing infrastructure or which is provided in a cloud computing infrastructure. The network 140 may be, for example, a wired network such as local area networks (LANs), wide area networks (WANs), metropolitan area networks (MANs), or integrated service digital networks (ISDNs), or a wireless communications network such as wireless LANs, code division multi access (CDMA), Wideband CDMA (WCDMA), long term evolution (LTE), long term evolution-advanced (LTE-A), 5G (generation) communications, Bluetooth™, or satellite communications, but is not limited thereto.

The network 140 may include connection of network elements such as hubs, bridges, routers, switches, and gateways. The network 140 may include one or more connected networks, for example, a multi-network environment, including a public network such as the Internet and a private network such as a secure corporate private network. Access to the network 140 may be provided through one or more wire-based or wireless access networks. Further, the network 140 may support various types of machine-to-machine (M2M) communications (for example, Internet of Things (IoT), Internet of Everything (IoE), Internet of Small Things (IoST)), transmitting and receiving information between distributed components such things to process the information, and/or 5G communications.

Figure 2:
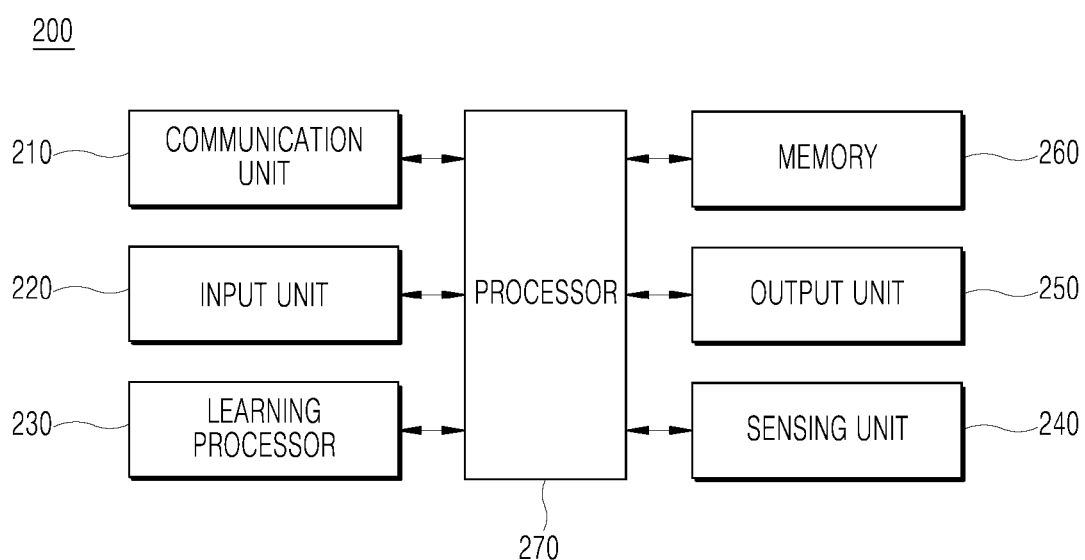
FIG. 2 is a block diagram illustrating a configuration of an apparatus for recommending a location of a charging station according to an embodiment of the present disclosure.
Figure 3:
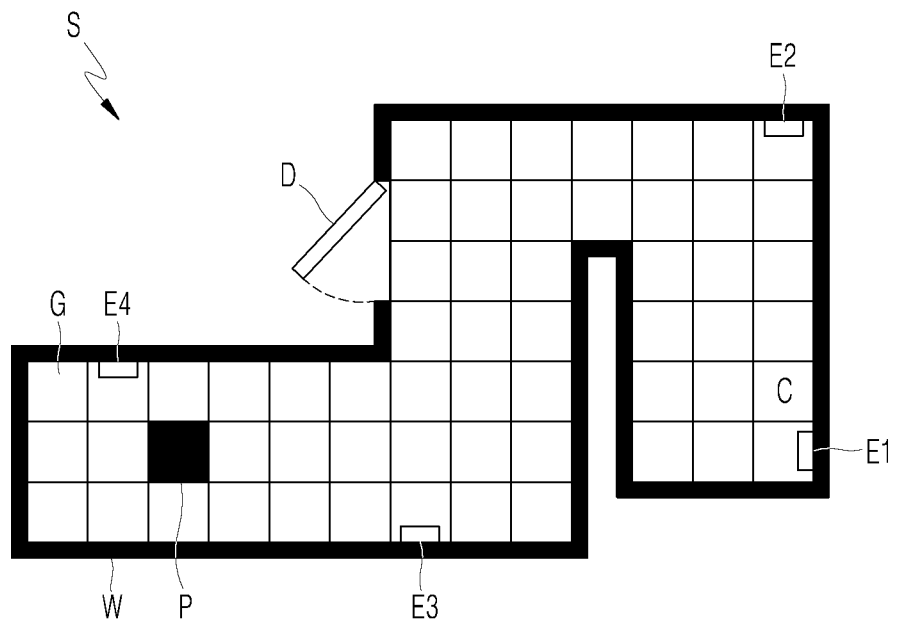
FIG. 3 is a view of an example of a space according to an embodiment of the present disclosure.
Figure 4:
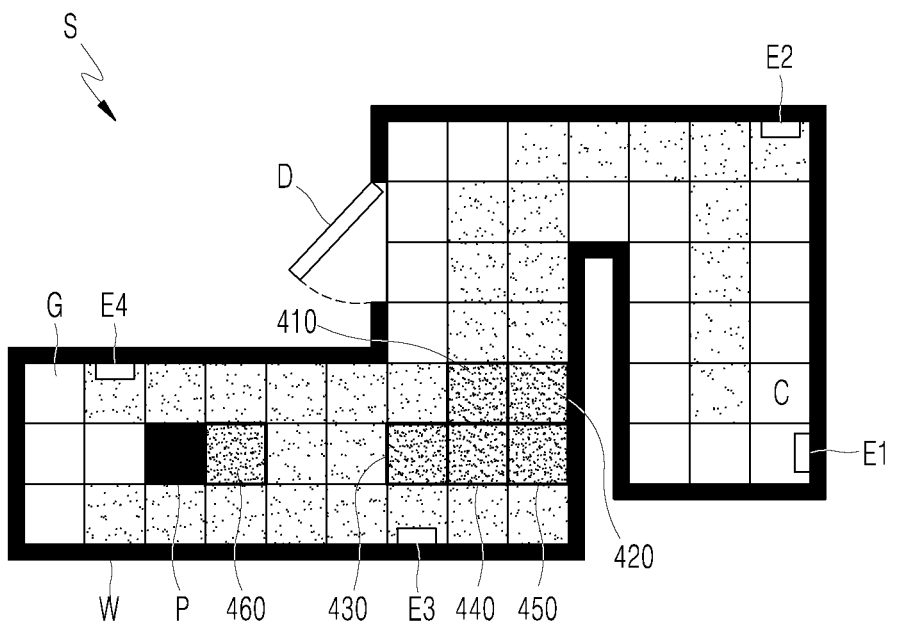
FIG. 4 is a view illustrating extraction of a candidate region according to an embodiment of the present disclosure.
Figure 5:
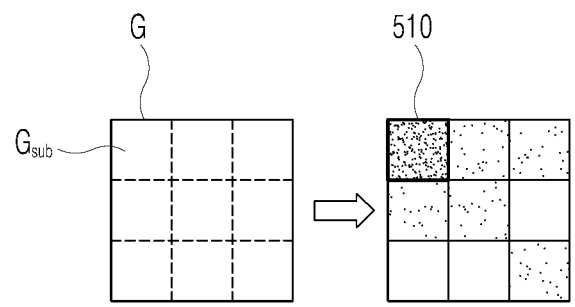
FIG. 5 is a view illustrating determining of density of a subregion according to an embodiment of the present disclosure.
Figure 6:
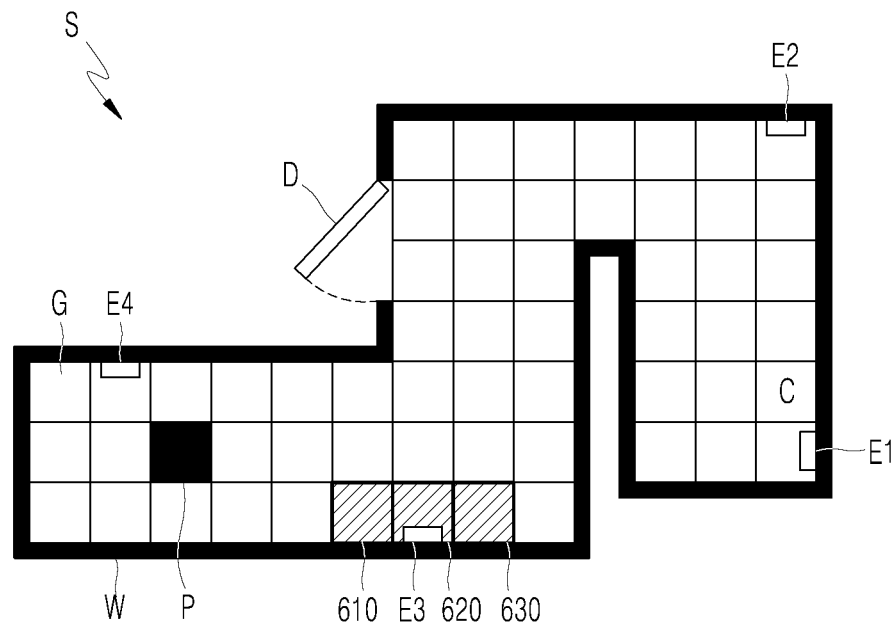
FIG. 6 is a view illustrating determining of a recommended location according to an embodiment of the present disclosure.

FIG. 2 is a block diagram illustrating a configuration of an apparatus for recommending a location of a charging station according to an embodiment of the present disclosure. FIG. 3 is a view of an example of a space according to an embodiment of the present disclosure, and FIG. 4 is a view illustrating extraction of a candidate region according to an embodiment of the present disclosure. FIG. 5 is a view illustrating determining of density of a subregion according to an embodiment of the present disclosure, and FIG. 6 is a view illustrating determining of a recommended location according to an embodiment of the present disclosure.

Referring to FIG. 2, an apparatus 200 for recommending a location of a charging station according to an embodiment of the present disclosure may include a communications unit 210, an input unit 220, an output unit 250, a memory 260, and a processor 270.

In an embodiment, the apparatus 200 for recommending a location of a charging station may be the control server 120 of FIG. 1. In another embodiment, the apparatus 200 for recommending a location of a charging station may be the robot 110 or the terminal 130 of FIG. 1. When the apparatus 200 is provided as the robot 110 or the terminal 130, the apparatus 200 for recommending a location of a charging station may further include a sensing unit 240. In addition, when the apparatus 200 is configured to perform an operation associated with artificial intelligence or machine learning, the apparatus 200 for recommending a location of a charging station may further include a learning processor 230.

The communications unit 210 may transmit and receive information or data with external devices such as the robot 110, the control server 120, or the terminal 130 using wired or wireless communication technology. For example, the communications unit 210 may transmit or receive sensor data, user input, a learning model, a control signal, and the like with the external devices. The communications unit 210 may use the communication technology, such as Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, and Near Field Communication (NFC).

In an embodiment, the communications unit 210 may receive movement path information from one or more robots 110 in a space including a plurality of regions, and may provide the received movement path information for the processor 270. In another embodiment, the communications unit 210 may receive movement path information from a terminal 130, receiving the movement path information from one or more robots 110.

Referring to FIG. 3, a space S, in which one or more robots 110 perform a task, may be defined. The space S may include a plurality of regions G partitioned by grids, and each of the plurality of regions G may have the same area. In another embodiment, a plurality of regions G may include at least one region having different areas and/or different shapes, depending on constraints of a physical space or design purposes.

In an embodiment, the space S may include structures such as a wall W, a column P, and a door D. A boundary of the space S, in which the robot 110 is able to move, may be determined by these structures. In the space S, a plurality of power supply terminals E1, E2, E3, and E4, as well as at least one charging station for charging one or more robots 110 may be provided. In FIG. 3, 'C' indicates a region in which a charging station is located.

Movement path information may include various types of information indicating movement of one or more robots 110. When a space corresponds to a coordinate system, the movement path information may include coordinate information of the robot 110 measured for a predetermined period of time or measured periodically at predetermined time intervals. In an aspect, when a space is defined as a Cartesian coordinate system, movement path information may include two-dimensional coordinate information (x, y) or three-dimensional coordinate information (x, y, z) of the robot 110. As an example, the space S, illustrated in FIG. 3, may correspond to a two-dimensional Cartesian coordinate system, and the coordinate information of the robot 110 may be two-dimensional coordinate information (x, y). In another aspect, movement path information may include two-dimensional coordinate information (x, y) and azimuth information ($\theta$), provided to represent a pose of the robot 110.

The predetermined period of time may indicate a time for which the acquisition of the coordinate information of the robot 110 continues, and may be defined by, for example, month, week, day, hour, and minute. The predetermined time interval may indicate a time cycle in which the coordinate information of the robot 110 is obtained, and may be defined by, for example, hour, minute, and second. The predetermined period of time and the predetermined time intervals may be variously selected according to the design purpose.

One or more robots 110 performing a task in the space S may obtain coordinate information thereof at predetermined time intervals (for example, a minute) for a predetermined period of time (for example, a day). In an aspect, the robot 110 may transmit coordinate information to the apparatus 200 whenever the coordinate information is obtained. In another aspect, the robot 110 may transmit coordinate information obtained during a predetermined period of time, to the apparatus 200 all at once, after the predetermined period of time elapses. In still another aspect, a transmission interval (for example, an hour) for transmitting coordinate information, obtained by the robot 110, to the apparatus 200 may be defined separately. The period, for which the robot 110 obtains coordinate information thereof, and the period, for which the robot 110 transmits the obtained coordinate information to the apparatus 200, may be variously selected depending on, for example, the capacity of a memory in the robot 110, and the communication environment and the design purpose of the robot 110 and the device 200.

In an embodiment, the communications unit 210 may receive driving information from the one or more robots 110. The driving information of the robot 110 may include, for example, an average moving speed of the robot 110, information on the number of times in which the robot 110 is stopped while driving, and information on the number of times in which the robot 110 is in contact with or collides with an object.

The input unit 220 may obtain various types of data. The input unit 220 may include at least one camera for obtaining a video signal, a microphone for obtaining an audio signal, and a user interface for receiving information from a user.

The input unit 220 may obtain, for example, learning data for model learning and input data used when output is obtained using a learning model. The input unit 220 may obtain raw input data. In this case, the processor 270 or the learning processor 230 may extract an input feature by preprocessing the input data.

In an embodiment, the input unit 220 may receive movement path information of one or more robots 110 via a user interface. In other words, the movement path information of the one or more robots 110 may be inputted by a user via the input unit 220.

The sensing unit 240 may obtain at least one of internal information of the apparatus 200, surrounding environment information of the apparatus 200, or user information by using various sensors. The sensing unit 240 may include a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (LiDAR) sensor, radar, or a combination thereof.

The output unit 250 may generate a visual, auditory, or tactile related output. The output unit 250 may include a display unit outputting visual information, a speaker outputting auditory information, and a haptic module outputting tactile information.

The memory 260 may store data supporting various functions of the apparatus 200. The memory 260 may store information or data received by the communications unit 210, and input information, input data, learning data, a learning model, and a learning history obtained by the input unit 220.

In an embodiment, the memory 260 may store movement path information received via the communications unit 210 or the input unit 220, or data derived therefrom. Moreover, the memory 260 may store a movement path profile to be described later.

The processor 270 may determine at least one executable operation of the apparatus 200 based on information determined or generated by using a data analysis algorithm or a machine learning algorithm. In addition, the processor 270 may control components of the apparatus 200 to perform the determined operation.

The processor 270 may request, retrieve, receive, or use information or data of the learning processor 230 or the memory 260, and may control components of the apparatus 200 to execute a predicted operation or an operation determined to be preferable of the at least one executable operation. In this case, when connection with an external device such as the robot 110, the control server 120, or the terminal 130 is necessary to perform the determined operation, the processor 270 may generate a control signal to control the corresponding external device, and may transmit the generated control signal to the corresponding external device.

In an embodiment, the processor 270 obtains intent information about user input, and may determine a requirement of a user based on the obtained intent information. The processor 270 may obtain intent information corresponding to user input by using at least one of a speech to text (STT) engine for converting voice input into a character string or a natural language processing (NLP) engine for obtaining intent information of a natural language.

In an embodiment, the at least one of the STT engine or the NLP engine may be composed of artificial neural networks, some of which are trained according to a machine learning algorithm. In addition, the at least one of the STT engine or the NLP engine may be trained by the learning processor 230, trained by a learning processor of an AI server, or trained by distributed processing thereof.

The processor 270 collects history information including, for example, operation contents and user feedback on an operation of the apparatus 200, and stores the history information in the memory 260 or the learning processor 230, or transmits the history information to an external device such as an AI server. The collected history information may be used to update a learning model.

The processor 270 may control at least some of components of the apparatus 200 to drive an application stored in the memory 260. Furthermore, the processor 270 may operate two or more components included in the apparatus 200 in combination with each other to drive the application.

In an embodiment, the processor 270 may determine a recommended location of a charging station based on movement path information of the one or more robots 110 provided by the communications unit 210 or the input unit 220. As described previously, the movement path information of the robot 110 may include coordinate information of the robot 110 obtained at predetermined time intervals.

The processor 270 may associate the coordinate information of the robot 110 with a corresponding region of the plurality of regions G. In an embodiment, associating coordinate information of the robot 110 with the plurality of regions G may include mapping or clustering the corresponding coordinate information to a corresponding region of the plurality of regions G. In an embodiment, associating coordinate information of the robot 110 with the plurality of regions G may include increasing a count value for a region to which the corresponding coordinate information belongs. As an example, as illustrated in FIG. 4, coordinate information of the robot 110, indicated by a point, may be associated with the plurality of regions G, and the number of points, which belong to each region, may correspond to a count value for each region.

The processor 270 may determine density of each of the plurality of regions G based on the count value for each of the plurality of regions G. As a result, density of a specific region may be associated with the number of times coordinate information of the robot 110 is obtained in the corresponding region.

When the plurality of regions G are regions having the same area, density may be determined according to a count value or a value proportional to the count value. When the plurality of regions G includes regions having different areas, density may be determined according to a count value per unit area or a value proportional to the count value per unit area.

The processor 270 may determine a recommended location of a charging station based on density of each of the plurality of regions G. In an embodiment, the processor 270 may extract one or more candidate regions having density equal to or greater than a first reference value, and may determine a recommended location of a charging station from the extracted candidate region or a region adjacent to the candidate region. For example, as illustrated in FIG. 4, six regions 410, 420, 430, 440, 450, and 460, having density equal to or greater than a first reference value, may be extracted as a candidate region.

In an embodiment, as illustrated in FIG. 5, each of the plurality of regions G may be divided into a plurality of subregions $G_{sub}$. The number of subregions $G_{sub}$ may be variously selected according to, for example, an area of the region G, an area of a charging station, and the design purpose. The subregion $G_{sub}$ may also be divided into a plurality of smaller regions.

In an embodiment, the processor 270 may extract one or more candidate subregions 510 having density equal to or greater than a second reference value from the extracted candidate region, and may determine a recommended location of a charging station from the one or more extracted candidate subregion 510. In this way, the recommended location of the charging station may be determined more precisely. In detail, when density of a candidate region is not uniform over subregions, a more preferable location of a charging station may be recommended.

The first reference value may refer to a minimum density which may be determined as a candidate region. The second reference value may refer to a minimum density which may be determined as a candidate subregion. The first reference value may be appropriately selected according to, for example, an area of the space S, an attribute of the space S, the number of robots 110 operated in the space S, and the design purpose. The second reference value may be appropriately selected according to, for example, the number of subregions $G_{sub}$ in the region G and the design purpose. The first reference value and the second reference value may be the same or different.

In an embodiment, the processor 270 may determine a region having the highest density among the candidate regions as a recommended location. For example, a region having the highest density among six regions 410, 420, 430, 440, 450, and 460 illustrated in FIG. 4 may be determined as a recommended location. This determination method may be effective when a location of a charging station is determined in a significantly large open space.

In an embodiment, the processor 270 may determine a region adjacent to candidate regions, particularly a region adjacent to a region having the highest density among candidate regions, as a recommended location. According to an attribute of the space S, a charging station may be preferably located in a region adjacent to a region having high density, rather than the region having high density. For example, in a space including a narrow passage, it may be effective that a charging station is located on an edge of the passage, as compared with a case in which a charging station is located in the middle of the passage. A region adjacent to a specific region may include a region sharing a boundary with the specific region, and may optionally include a region diagonally adjacent to the specific region.

In an embodiment, the processor 270 determines whether candidate regions or regions adjacent to candidate regions correspond to a predetermined unsuitable region, and may exclude a region corresponding to the unsuitable region as a candidate region or a recommended location. The unsuitable region may refer to a region where it is difficult to install a charging station due to an attribute of the region. The unsuitable region may be determined based on, for example, whether power is supplied by power supply terminals E1, E2, E3, and E4, whether a region is adjacent to the wall W or the column P, and whether a region is adjacent to the door D. As an example, the unsuitable region may include a region to which power is not supplied by the power supply terminals E1, E2, E3, and E4, a region not adjacent to the wall W or the column P, a region adjacent to the door D, or a combination thereof.

Referring to FIG. 4, the candidate regions 410, 430, and 440 are not adjacent to the wall W or the column P, and are thus determined as an unsuitable region. Moreover, power is not supplied to the candidate regions 420, 450, and 460 by the power supply terminals E3 and E4, so the candidate regions 420, 450, and 460 may be determined as an unsuitable region.

Thus, as illustrated in FIG. 6, among regions adjacent to the candidate regions 410, 420, 430, 440, 450, and 460, regions 610, 620, and 630 are adjacent to the wall W or the column P and power is applied thereto by the power supply terminal E3, so the regions may be determined as a recommended location.

In another embodiment, the processor 270 may determine a recommended location by additionally deriving a degree of congestion on each of the plurality of regions G, in addition to the density described previously. To this end, driving information of the one or more robots 110 may be provided for the processor 270 via the communications unit 210 or the input unit 220. The driving information of the robot 110 may include, for example, an average moving speed of the robot 110, information on the number of times in which the robot 110 is stopped while driving, and information on the number of times the robot 110 contacts or collides with an object.

The processor 270 associates driving information of the one or more robots 110 with the plurality of regions G to determine the degree of congestion on each of the plurality of regions G. The processor 270 may determine the degree of congestion on each of the plurality of regions G based on an average moving speed of the robot 110, information on the number of times in which the robot 110 is stopped while driving, information on the number of times the robot 110 contacts or collides with an object, or a combination thereof. In an aspect, when the average moving speed of the robot 110 is lower, the degree of congestion on a corresponding region may be increased. In another aspect, when the number of times in which the robot 110 is stopped while driving is greater, the degree of congestion on the corresponding region may be increased. In still another aspect, when the number of times the robot 110 contacts or collides with an object is greater, the degree of congestion on the corresponding region may be increased.

When a region with high density has a significantly high degree of congestion, the region may not be suitable as a location of a charging station. Thus, the processor 270 may determine a recommended location of a charging station in consideration of both of the determined density and the determined degree of congestion.

In an aspect, the processor 270 may calculate a density score proportional to density and a congestion score proportional to a degree of congestion, with respect to each of the plurality of regions G, and subtract the congestion score from the density score to calculate a final score. The candidate region or recommended location may be determined based on the calculated final score. In this case, the weight may be applied to the density score and the congestion score. The weight may be variously selected and adjusted according to, for example, an area of the space S, an attribute of the space S, and the design purpose.

In another aspect, the processor 270 may extract one or more candidate regions having density equal to or greater than a first reference value from the plurality of regions G, and exclude a congested region having a degree of congestion equal to or greater than a third reference value from a corresponding candidate region. The third reference value may refer to a maximum degree of congestion which is allowable as a location of a charging station. The third reference value may be appropriately selected according to, for example, an area of the space S, an attribute of the space S, the number of robots 110 operated in the space S, and the design purpose.

In an embodiment, a plurality of charging stations may be provided in the space S. In an aspect, the processor 270 may determine a plurality of recommended locations in consideration of the number of charging stations. The number of recommended locations may be equal to or more than the number of charging stations. In another aspect, the processor 270 may determine a combination of recommended locations based on density, a degree of congestion, whether a region corresponds to an unsuitable region, or a combination thereof.

In an embodiment, due to a difference in, for example, working attributes and compatibility issues, the plurality of robots 110 may be divided into two or more groups, and different charging stations may be used for respective groups. In this case, the processor 270 may classify movement path information of the robots 110 in each group, and separately determine a recommended location of a charging station for each group.

In addition, in the embodiments described previously, the processor 270 determines a recommended location of a charging station based on movement path information and driving information of the robot 110 obtained for a predetermined period of time.

However, the processor 270 may determine a recommended location of a charging station in consideration of not only movement path information obtained at the time but also movement path information obtained in the past. To this end, the apparatus 200 may use a movement path profile stored in the memory 260.

The movement path profile may include movement path information obtained in the past or data derived therefrom. In an aspect, the movement path profile may include coordinate information of the robot 110 obtained in the past. However, in another aspect, the movement path profile may include data derived by associating coordinate information of the robot 110 obtained in the past with the plurality of regions G. For example, the movement path profile may include a cumulative count value for each of the plurality of regions G.

The processor 270 may load movement path profile stored in the memory 260 and update a movement path profile by using movement path information obtained at this time. The processor 270 may determine density of each of the plurality of regions G based on the updated movement path profile. The processor 270 may store the updated profile in the memory 260, and the stored movement path profile may be used when a recommended location is determined in the future.

In an embodiment, the processor 270 may load a movement path profile including a cumulative count value for each of the plurality of regions G, and adjust the cumulative count value of the movement path profile by associating the coordinate information of the robot 110, obtained this time, with the plurality of regions G. The processor 270 may determine density of each of the plurality of regions G based on the adjusted cumulative count value.

In an aspect, adjusting a cumulative count value of a movement path profile may include increasing a cumulative count value for a region, to which coordinate information obtained at this time belongs. As an example, the cumulative count value for each region may be increased by the number of points which belong to each region in FIG. 4. As described above, when the cumulative count value for each region is only increased using the obtained coordinate information, there may be an advantage in that the entire coordinate information is not processed every time. Moreover, rather than coordinate information that is raw data, summary data such as a cumulative count value is maintained in a movement path profile, therefore processing speed and efficiency may be improved.

In another aspect, the adjusting a cumulative count value of a movement path profile may include reducing a weight of coordinate information obtained previously, or increasing a weight of coordinate information obtained at this time. In other words, a cumulative count value of a movement path profile may be adjusted to relatively reduce influence of coordinate information obtained in the past and to relatively increase influence of recently obtained coordinate information. As described above, when a decay model is applied to the movement path profile, the decay model may respond flexibly to a change in a recently occurring movement path.

The processor 270 may guide a recommended location determined by various methods described previously. In an aspect, the processor 270 may guide a recommended location through the output unit 250. For example, the processor 270 may display a recommended location on a space map via a display unit, and may guide a recommended location by voice via a speaker. In another aspect, the processor 270 may guide a recommended location through the robot 110 or the terminal 130. The processor 270 may generate a control signal including information on a recommended location and transmit the control signal to the robot 110 or the terminal 130. The robot 110 or the terminal 130, receiving the control signal may display a recommended location on a space map via a display unit thereof or may guide a recommended location by voice via a speaker. In an embodiment, the robot 110 may directly move to a recommended location to guide the recommended location.

Figure 7:
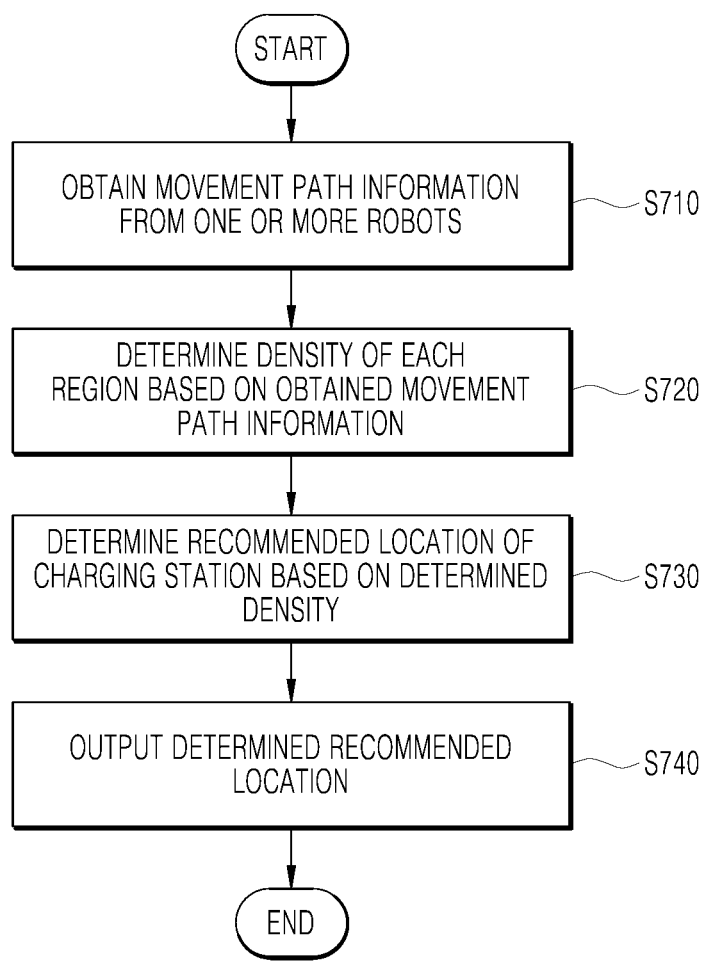
FIG. 7 is a flow chart illustrating a method for recommending a location of a charging station according to an embodiment of the present disclosure.

FIG. 7 is a flow chart illustrating a method for recommending a location of a charging station according to an embodiment of the present disclosure. The method, illustrated in FIG. 7, may be performed by the apparatus 200 of FIG. 2. In an embodiment, the apparatus 200 may be a control server.

In step S710, the apparatus 200 may obtain movement path information from one or more robots in a space including a plurality of regions. In an embodiment, the movement path information may include coordinate information of a robot, obtained periodically for a predetermined period of time.

In step S720, the apparatus 200 may determine density of each of a plurality of regions based on the obtained movement path information. The apparatus 200 may associate coordinate information of a robot with a plurality of regions. The associating of coordinate information of the robot with the plurality of regions may include an increasing of a count value for a region to which the corresponding coordinate information belongs. The apparatus 200 may determine density of each of the plurality of regions based on a count value for each of the plurality of regions.

In step S730, the apparatus 200 may determine a recommended location of a charging station based on the determined density. The apparatus 200 may extract one or more candidate regions having a density equal to or greater than a first reference value, and may determine the recommended location of the charging station from the extracted candidate region. In an aspect, the apparatus 200 may determine, as the recommended location, a region having the highest density among candidate regions or a region adjacent to a region having the highest density. In another aspect, the apparatus 200 may determine whether candidate regions correspond to a predetermined unsuitable region and may exclude a region corresponding to the unsuitable region from the candidate region.

In step S740, the apparatus 200 may output the determined recommended location. The apparatus 200 may guide the recommended location on a space map via a display unit thereof or may guide the recommended location by voice via a speaker. The apparatus 200 may guide the recommended location via an external device such as the robot 110 or the terminal 130.

Figure 8:
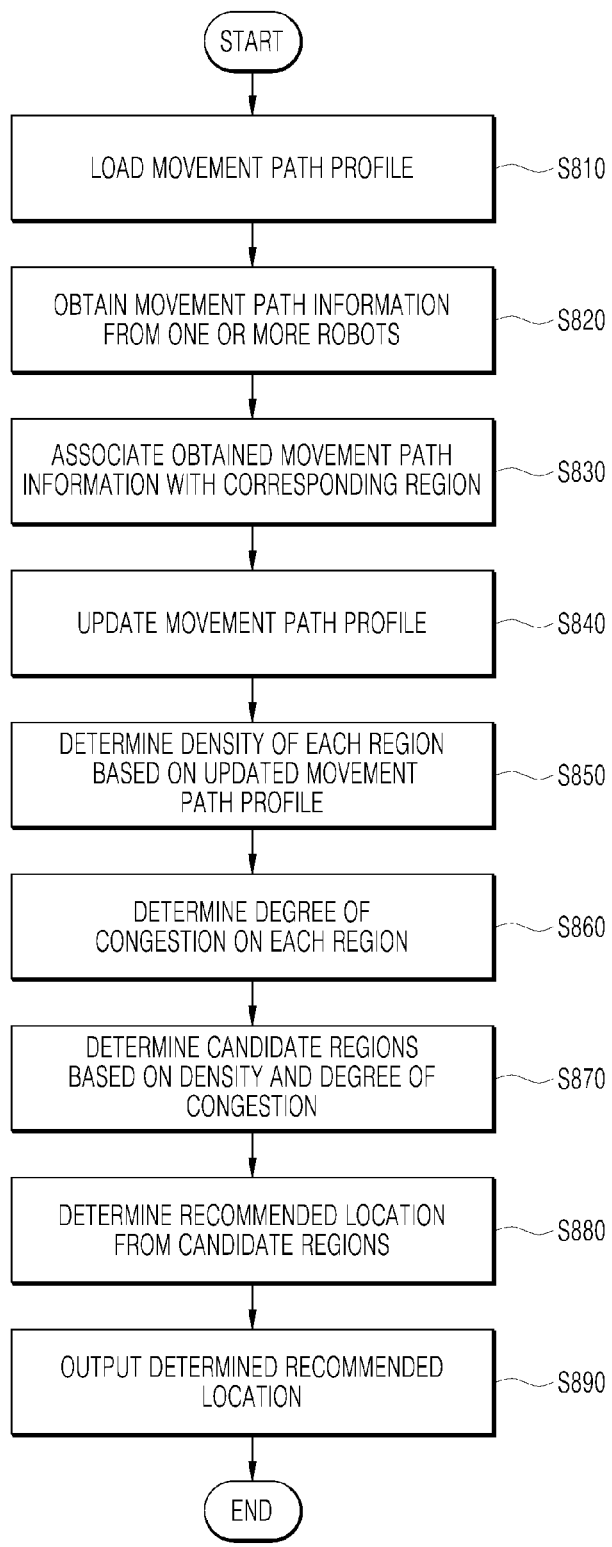
FIG. 8 is a flow chart illustrating a method for recommending a location of a charging station according to another embodiment of the present disclosure.

FIG. 8 is a flow chart illustrating a method for recommending a location of a charging station according to another embodiment of the present disclosure. The method, illustrated in FIG. 8, may be performed by the apparatus 200 of FIG. 2. In an embodiment, the apparatus 200 may be a control server. Detailed descriptions of operations overlapping with the method illustrated in FIG. 7 will be omitted.

In step S810, the apparatus 200 may load a movement path profile from a memory. The movement path profile may include data derived by associating coordinate information of the robot, obtained in the past, with a plurality of regions. For example, the movement path profile may include a cumulative count value for each of the plurality of regions. Step S810 may be performed before step S820, but may also be performed after step S820.

In step S820, the apparatus 200 may obtain movement path information from one or more robots in a space including a plurality of regions. The movement path information may include coordinate information of a robot, obtained periodically for a predetermined period of time.

In step S830, the apparatus 200 may associate the obtained movement path information with a corresponding region of the plurality of regions, and in step S840, the apparatus 200 may update the movement path profile. Updating the movement path profile may include adjusting a cumulative count value of the movement path profile by associating the coordinate information of a robot obtained at the time with the plurality of regions. In an aspect, adjusting the cumulative count value of the movement path profile may include increasing a cumulative count value for a region to which coordinate information obtained, at this time, belongs. In another aspect, adjusting the cumulative count value of the movement path profile may include reducing a weight of coordinate information obtained previously.

In step S850, the apparatus 200 may determine the density of each of the plurality of regions based on the updated movement path profile.

In step S860, the apparatus 200 may determine a degree of congestion in each of the plurality of regions based on driving information of one or more robots. The driving information of the robot may include, for example, an average moving speed of the robot, the number of times in which the robot is stopped while driving, and information on the number of times the robot contacts or collides with an object. Step S860 and an operation based thereon may optionally be omitted.

In step S870, the apparatus 200 may determine one or more candidate regions based on the determined density or the determined degree of congestion. In step S880, the apparatus 200 may determine a recommended location of a charging station from one or more candidate regions.

In step S890, the apparatus 200 may output the determined recommended location.

Referring to FIG. 2 again, in an embodiment, the apparatus 200 for recommending a location of a charging station may further include the learning processor 230 for performing an operation regarding artificial intelligence or machine learning.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

The learning processor 230 may allow a model, composed of an artificial neural network to be trained using learning data. Here, the trained artificial neural network may be referred to as a trained model. The trained model may be used to infer a result value with respect to new input data rather than learning data, and the inferred value may be used as a basis for a determination to perform an operation of classifying the detected hand motion.

The learning processor 230 may train the artificial neural network by using one or more various parameters used to determine a recommended location of a charging station as learning data.

In an embodiment, the learning processor 230 may train the artificial neural network by using, as learning data, information on the space S, movement path information on one or more robots 110, driving information, and a recommended location of a charging station determined by the processor 270 or a combination of recommended locations. The information on the space S may include at least one of the area of the space S, the number of robots 110 in the space S, the number of charging stations, information on a structure in the space S, or a location of a power supply terminal.

In an embodiment, the learning processor 230 may determine a recommended location of a charging station or a combination of recommended locations by using movement path information obtained by the apparatus 200 using the learning model based on the artificial neural network, or by using the density or degree of congestion determined by the apparatus 200 as input data.

Figure 9:
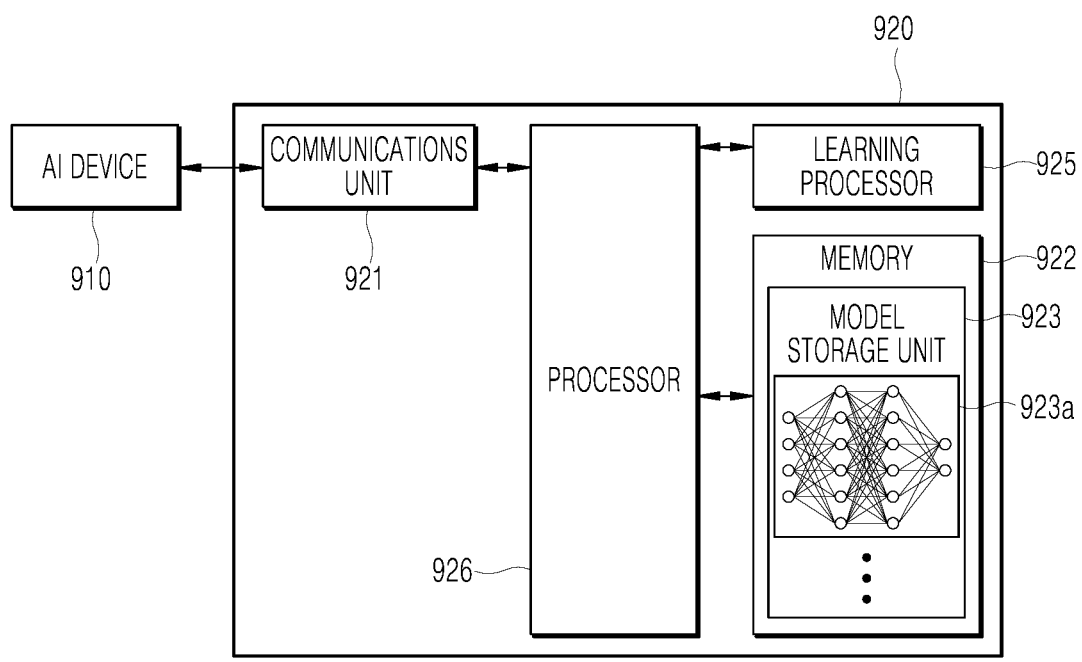
FIG. 9 is a view illustrating a robot system according to another embodiment of the present disclosure.

The learning processor 230 may perform artificial intelligence or machine learning processing together with a learning processor 925 of an AI server 920 of FIG. 9. The learning processor 230 may include a memory integrated or implemented in the apparatus 200. Alternatively, the learning processor 230 may be implemented by using the memory 260, an external memory directly coupled to the apparatus 200, or a memory maintained in an external device.

FIG. 9 is a view illustrating a robot system according to another embodiment of the present disclosure. In an embodiment, a robot system may be implemented as an AI system capable of performing artificial intelligence or machine learning. Referring to FIG. 9, a robot system according to another embodiment of the present disclosure may include an AI device 910 and the AI server 920.

In an embodiment, the AI device 910 may be the robot 110, the control server 120, the terminal 130 of FIG. 1, or the apparatus 200 of FIG. 2. In another embodiment, the AI server 920 may be the control server 120 of FIG. 1 or the apparatus 200 of FIG. 2.

The AI server 920 may refer to a device using a trained artificial neural network or a device training an artificial neural network by using a machine learning algorithm. The AI server 920 may be composed of a plurality of servers to perform distributed processing. The AI server 920 is included as a partial configuration of the AI device 910 and may perform at least partial artificial intelligence or machine learning processing.

The AI server 920 may include a communications unit 921, a memory 922, a learning processor 925, and a processor 926.

The communications unit 921 may transmit and receive data with an external device such as the AI device 910.

The memory 922 may include a model storage unit 923. The model storage unit 923 may store a model (or an artificial neural network 923a) learning or learned via the learning processor 925.

The learning processor 925 may train the artificial neural network 923a by using learning data. The learning model may be used while mounted in the AI server 920 of the artificial neural network, or may be used while mounted in an external device such as the AI device 910.

The learning model may be implemented as hardware, software, or a combination of hardware and software. When a portion or the entirety of the learning model is implemented as software, one or more instructions, which constitute the learning model, may be stored in the memory 922.

The processor 926 may infer a result value with respect to new input data by using the learning model, and generate a response or control command based on the inferred result value.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, permutations, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method for recommending a location for installation of a charging station, the method comprising:
  obtaining movement path information from a robot in a space divided into a plurality of regions, wherein the movement path information includes coordinate information indicating a location of the robot within the space at a time at which the coordinate information is obtained, obtained periodically for a predetermined period of time;
  obtaining driving information of the robot;
  determining a degree of congestion in each of the plurality of regions based on the obtained driving information;
  calculating a count value for each of the plurality of regions, wherein the count value corresponds to a number of times at which the location of the robot belongs to the corresponding region over the predetermined period;
  determining a density of each of the plurality of regions based on the calculated count value for the corresponding region, wherein the determined density is associated with the number of times at which the location of the robot belongs to the corresponding region over the predetermined period;
  selecting one of the plurality of regions as the recommended location for installation of the charging station to charge the robot, based on a result of subtracting the degree of congestion from the density, for each of the plurality of regions;
  generating a control signal including information regarding the recommended location; and
  transmitting the control signal to the robot, to cause movement of the robot to the recommended location.

2. The method of claim 1, further comprising:
  loading a movement path profile; and
  updating the movement path profile by using the obtained movement path information,
  wherein the determining the density includes determining the density based on the updated movement path profile.

3. The method of claim 2, wherein the movement path profile includes a cumulative count value for each of the plurality of regions, and
  wherein the updating the movement path profile includes adjusting the cumulative count value by associating the obtained movement path information with a corresponding region of the plurality of regions.

4. The method of claim 3, wherein the updating the movement path profile further includes adjusting the cumulative count value by reducing a weight for movement path information previously obtained with respect to a weight for the obtained movement path information.

5. The method of claim 1, wherein the driving information includes at least one of an average moving speed of the robot, a number of times in which the robot is stopped while driving, or a number of times in which the robot collides with an object.

6. The method of claim 1, wherein the selecting one of the plurality of regions as the recommended location includes:
  extracting one or more candidate regions having a density equal to or greater than a first reference value, from the plurality of regions; and
  selecting one of the one or more candidate regions or regions adjacent to the candidate regions as the recommended location.

7. The method of claim 6, wherein each of the plurality of regions includes a plurality of subregions, and
  wherein the extracting the one or more candidate regions includes extracting one or more candidate subregions having a density equal to or greater than a second reference value, from the one or more candidate regions.

8. The method of claim 6, wherein the selecting one of the plurality of regions as the recommended location further includes excluding a predetermined unsuitable region from the recommended location.

9. The method of claim 1, further comprising:
  training an artificial neural network by using information about the space, movement path information and driving information of the robot, and the recommended location for installation of the charging station, as learning data.

10. The method of claim 9, further comprising:
  selecting one of the plurality of regions as the recommended location for installation of the charging station based on analyzing the obtained movement path information or the determined density by using a learning model based on the artificial neural network.

11. An apparatus comprising:
  a transceiver for communicating with one or more robots in a space divided into a plurality of regions; and
  at least one processor configured to:
  obtain movement path information from a robot of the one or more robots, wherein the movement path information includes coordinate information indicating a location of the robot within the space at a time at which the coordinate information is obtained, obtained periodically for a predetermined period of time;
  obtain driving information of the robot;
  determine a degree of congestion in each of the plurality of regions based on the obtained driving information;
  calculate a count value for each of the plurality of regions, wherein the count value corresponds to a number of times at which the location of the robot belongs to the corresponding region over the predetermined period;
  determine a density of each of the plurality of regions based on the calculated count value for the corresponding region, wherein the determined density is associated with the number of times at which the location of the robot belongs to the corresponding region over the predetermined period;
  select one of the plurality of regions as a recommended location for installation of a charging station to charge the robot, based on a result of subtracting the degree of congestion from the density, for each of the plurality of regions;
  generate a control signal including information regarding the recommended location; and
  transmit the control signal to the robot, to cause movement of the robot to the recommended location.

12. The apparatus of claim 11, further comprising a memory storing a movement path profile,
  wherein the at least one processor is further configured to:
  update the movement path profile by using the obtained movement path information; and
  determine the density based on the updated movement path profile.

13. The apparatus of claim 11, wherein the movement path profile includes a cumulative count value for each of the plurality of regions, and
  wherein the at least one processor is further configured to:
  adjust the cumulative count value by associating the obtained movement path information with a corresponding region of the plurality of regions; and determine the density based on the adjusted cumulative count value.

14. The apparatus of claim 11, wherein the apparatus includes any one of the one or more robots, a control server, or a terminal communicatively connected to the control server.

15. A system comprising:
one or more robots in a space divided into a plurality of regions;
a charging station for charging the one or more robots; and
a control server,
wherein the control server is configured to:
obtain movement path information from a robot of the one or more robots, wherein the movement path information includes coordinate information indicating a location of the robot within the space at a time at which the coordinate information is obtained, obtained periodically for a predetermined period of time;
obtain driving information of the robot;
determine a degree of congestion in each of the plurality of regions based on the obtained driving information;
calculate a count value for each of the plurality of regions, wherein the count value corresponds to a number of times at which the location of the robot belongs to the corresponding region over the predetermined period;
determine a density of each of the plurality of regions based on the calculated count value for the corresponding region, wherein the determined density is associated with the number of times at which the location of the robot belongs to the corresponding region over the predetermined period;
select one of the plurality of regions as a recommended location for installation of the charging station to charge the robot, based on a result of subtracting the degree of congestion from the density, for each of the plurality of regions;
generate a control signal including information regarding the recommended location; and
transmit the control signal to the robot, to cause movement of the robot to the recommended location.

* * * * *